United States Patent [19]
Kurimoto et al.

[11] 3,771,165
[45] Nov. 6, 1973

[54] RECORDER INK SUPPLYING APPARATUS
[75] Inventors: Kozo Kurimoto; Sosuke Watanabe; Hiroyasu Uchida, all of Katsuta, Japan
[73] Assignee: Hitachi, Ltd., Tokyo, Japan
[22] Filed: May 12, 1972
[21] Appl. No.: 252,671

[30] Foreign Application Priority Data
May 21, 1971 Japan.............................. 46/34061
May 28, 1971 Japan.............................. 46/36238

[52] U.S. Cl. .............................................. 346/140
[51] Int. Cl. ........................................... G01d 15/16
[58] Field of Search ..................................... 346/140

[56] References Cited
UNITED STATES PATENTS
| | | | |
|---|---|---|---|
| 2,223,541 | 12/1940 | Baker | 401/226 |
| 3,083,689 | 4/1963 | Hegener | 346/140 |
| 3,150,915 | 9/1964 | Dixon et al. | 346/140 |
| 3,327,315 | 6/1967 | Felton | 346/140 |
| 3,441,950 | 4/1969 | Miller | 346/140 |

Primary Examiner—Joseph W. Hartary
Attorney—Thomas E. Beall, Jr.

[57] ABSTRACT

The recorder ink supplying apparatus is provided with an ink bottle stationarily mounted and being capable of pressurizing ink, an auxiliary tank mounted on the movable pen-carriage of the recorder and having splash baffles permitting free circulation of the ink within the auxiliary tank but preventing splashing or waving action with resulting bubbles, a relaying tank mounted on the cantilevered pen arm for sucking the ink from the auxiliary tank by capillary action, and a recording pen mounted at the end of the arm cantilevered from the pen-carriage and supplied with ink from the relaying tank. Ink pressure fluctuations within the auxiliary tank on the pen-carriage caused by the deformation of the flexible hose between the ink bottle and auxiliary tank during rapid movement of the pen-carriage are compensated for by trapped air above the ink level in the auxiliary tank, to effectively form a pressurized surge tank. The relatively small capillary relaying tank provides a ready ink supply for the pen that does not materially change in weight, so that the pen pressure will not change due to ink consumption.

14 Claims, 7 Drawing Figures

PATENTED NOV 6 1973 3,771,165

RECORDER INK SUPPLYING APPARATUS

BACKGROUND OF THE INVENTION

The present invention generally relates to recorders having a recorder pen supplied with ink from a reservoir or source, and particularly to an improved ink supplying apparatus for the recorder pen.

The well known recorder will record input information with a permanent ink record by moving a recording pen in correlation with the input for recording this movement on a recording paper, which also usually moves. It is conventional to supply the ink to the recording pen from an ink bottle through a small diameter, slender tube.

In a conventional recorder, the ink bottle is provided apart from the recording pen that is supplied with ink from the bottle. The ink is supplied to the pen through capillary action of the small diameter, slender tube extending between the bottle and the recording pen. While such a system had proved to be quite acceptable in the past, recently high speed recording has been required for the recording pen, with recording speeds of 1,000 mm/sec being realized. As the recording speed is increased, difficulties with the slender tube that extends between the recording pen and the ink bottle developed due to the shaking and/or deformation of the tube throughout its length, particularly at its opposite ends wherein it is connected respectively to the movable carriage and stationary ink bottle. This high speed action has caused the supply of ink to pause temporarily. Further, negative pressures occurring within the slender tube by extension and contraction thereof will change the ink pressure within the tube so that ink may be returned from the pen to the ink bottle. As a result of all of the above, the ink record will many times pause or be interrupted and become thin, so that a perfect and fine record cannot be obtained.

As a solution, it has been suggested that the ink bottle be directly provided on the pen-carriage of the recorder without using a flexible small diameter, slender tube between relatively moving parts. With such a construction, the ink bottle and the ink contained therein become a load against the balancing motor for driving the pen-carriage to greatly increase the inertia, which is quite disadvantageous at high recording speeds wherein the carriage must reverse directions and accelerate rapidly. As a partial solution to reduce the inertia of the ink bottle and ink contained therein, the ink bottle has been greatly decreased in storage capacity to correspondingly increase the response speed, which naturally has the effect of reducing the capacity of the recording, which requires frequent filling of the ink bottle. Further, since the ink bottle is mounted directly on the pen-carriage and subjected to all of its movements, the ink within the bottle will vibrate, splash and the like during movement of the pen-carriage. As the recording speed rises, the ink will be shakened and splashed a corresponding increased amount to accordingly produce many bubbles and fluctuation of the pressure of the ink at the outlet of the pen. These bubbles and ink pressure fluctuations will cause the record to pause and become thin.

SUMMARY OF THE INVENTION

It is an object of the present invention to overcome the above-mentioned disadvantages of the prior art by providing a new ink supplying apparatus particularly suited to high speed recording that will not have the above-mentioned disadvantages and will satisfactorily supply ink to the recording pen under high speed operation without producing interrupted and thin recording lines.

Advantageously, the pen-carriage is provided with an auxiliary reserve tank supplied with ink from a stationary ink bottle, with the auxiliary tank having means therein, particularly baffle plates, for reducing the splashing and wave action of the ink within the auxiliary tank.

A further feature of the present invention is to provide a relaying means, particularly on the cantilevered pen-carrying arm for feeding a good supply of ink to the pen by capillary action, without materially changing the load on the arm as ink is consumed.

While the flexible small diameter tube between the stationary ink supply and auxiliary tank on the movable carriage will produce surges and rapid changes in ink pressure, particularly during high speed recording, these pressure fluctuations will not reach the pen due to the construction of the auxiliary tank that provides for ink pressurization with a trapped air volume within the auxiliary tank, so that the same functions as a surge tank.

BRIEF DESCRIPTION OF THE DRAWING

Further objects, features and advantages of the present invention will become more clear from the following detailed description of the drawing, wherein:

FIG. 2b is a perspective view of the baffle plate within the tank of FIG. 2a;

FIG. 3b is an end view of the baffle plates of the tank according to the embodiment of FIG. 3a;

FIG. 4b is a perspective view of the internal capillary member of FIG. 4a.

DETAILED DESCRIPTION OF THE INVENTION

Figure 1:
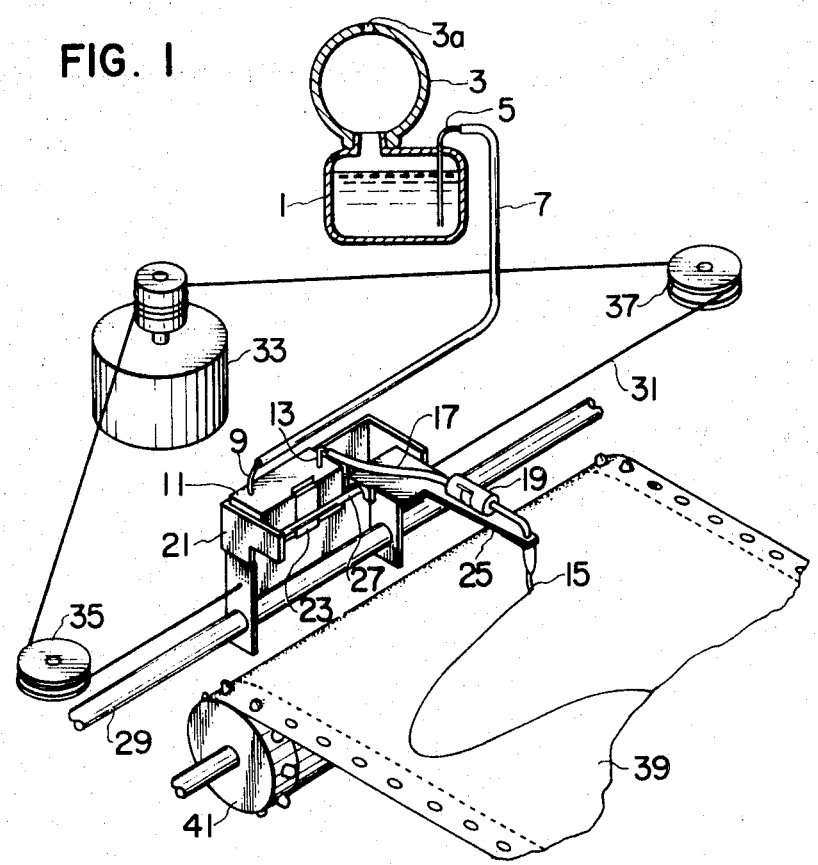
FIG. 1 is a partial, somewhat schematic perspective view of an embodiment of an ink supplying mechanism for a recorder according to the present invention.

A preferred embodiment of the present invention is specifically shown in FIG. 1, for its particular advantages, although it is realized that the invention may take on many different forms. As shown in FIG. 1, a large capacity ink storage or supply bottle 1 is suitably mounted on any stationary portion of the recorder that is convenient. An outlet of the ink bottle 1 is fluid connected to a resilient wall, preferably rubber, pump 3 having an atmospheric vent aperture 3a on the top thereof. A metallic or other rigid pipe 5 is mounted to extend through the wall of the bottle 1 to have its lower end below the normal liquid level within the bottle 1 and its outer upper end telescopically and fluid connected with the adjacent end of a flexible small diameter, slender tube 7, for example a rubber tube. The tube 7 is fluid connected between the pipe 5 and an inlet pipe 9 of an auxiliary ink tank 11. An outlet pipe 13 of the auxiliary tank 11 is connected to a recording pen 15 by a slender tube 17 through a relaying tank 19.

The auxiliary tank 11 is fixedly mounted on the movable pen-carriage 21 by a mounting fixture 23. The pointer or cantilevered pen-arm 25 is attached at one end, preferably pivotally, to a rod 27 of the pen-carriage 21. The pen 15 is carried at the outer end of the arm of pointer 25. Further, the ink relaying tank 19 is mounted on the cantilevered arm or pointer 25 closely adjacent the pen 15. A guide arm 29 extends through correspondingly formed holes or bores in the two side walls of the pen-carriage 21 to allow reciprocation of the pen-carriage 21 along the axis of the guide member rod 29. A cable, tape, string or the like 31 is connected at its opposite ends to the pen-carriage 21 and driven to reciprocate the pen-carriage 21 to the right and left, as viewed in FIG. 1, along the guide member 29. The cable or the like 31 is wrapped several times around a drive shaft of a balancing motor 31 to be driven thereby according to input signals received by the balance motor to be recorded. The cable 31 is further guided around pulleys 35 and 37 to direct its force generally along the axis of the guide rod 29, which pulleys are rotatably mounted on the stationary portion of the recorder along with the balancing motor 33. In a conventional manner, recording paper 39 is preferably fed away from the pen 15 by a sprocketed feed roll 41 according to a desired variable, for example, time or other input. The basic recorder structure of means for feeding recorder paper, a movable carriage, a pen and means for driving both the carriage and the paper feed may be of any type to function in combination with the ink supplying means of the present invention.

Figure 2A:
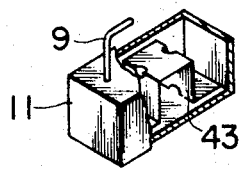
FIG. 2a is a partial cross section and perspective view of an auxiliary reserve tank used in the embodiment of FIG. 1.
Figure 2B:
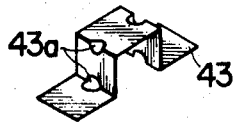

The auxiliary ink tank 11, which is one of the particularly important features of the present invention is shown in partial cross section and perspective in FIG. 2a in the position that it assumes in FIG. 1. As shown, the auxiliary tank 11 is completely closed except for its ink input pipe 9 and its ink output pipe 13, which latter pipe is only shown in FIG. 1. The partition or baffle plate 43 is within the auxiliary tank 11 to prevent wave action, splashing and the like of the ink within the tank as the movable carriage reciprocates along the guide rod 29, particularly at high speed. In the auxiliary tank embodiment of FIGS. 1, 2a and 2b, the partition or baffle plate 43 is constructed of flat sheet material, preferably metal, that is bent to form one or more, two being shown, vertical walls or baffle plates, and horizontal spacing portions, which properly locate the vertical baffle plates within the tank. The vertical baffle plates or partitions extend generally from side wall to side wall perpendicular to the axis of the guide rod 29 to divide the auxiliary tank 11 into a plurality of chambers. Further, upper and lower holes or apertures 43a are formed in the baffle plates to allow ink to travel from one chamber to an adjacent chamber, but with a damping action. Of course, more holes may be provided at the top and bottom, or throughout the plate if desired, without changing the function of the plate as a fluid flow restrictor or baffle.

Figure 3A:
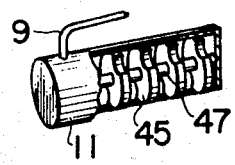
FIG. 3a is a partial cross section and perspective view of another embodiment of an auxiliary reserve tank to be used in place of the tank of FIG. 2a within the apparatus of FIG. 1.

The auxiliary tank 11 may be constructed according to the embodiment of FIG. 3a, with the outer cylindrical tank being closed at both ends and provided with fluid access only by means of the previously described pipes 9 and 13, respectively the inlet and outlet for the ink. As in FIGS. 2a and 2b, the interior of the tank 11 is divided into a plurality of chambers by means of a partition or baffle member having a plurality of baffle plates 45 uniformly spaced along and carried by the generally central rod 47. Each of the baffle plates 45 has a cut-out portion 45a at its top and bottom, substantially diametrically opposed or 180° apart from each other with respect to the center of the plates, as seen particularly in FIG. 3b. Other configurations for the holes may be provided if desired, that is holes may be provided at other peripheral locations around the plate or a plurality of holes may be provided within the confines of the outer perimeter of the plates. In any event, the holes in the plates 45 will allow restricted ink flow between adjacent chambers to provide a damping action for ink pulsations or waving motion produced by vibrations and movement of the carriage, particularly during high speed operation.

The operation of the elements described above is as follows.

When it is desired to use the recorder, the aperture 3a is shut or closed with the operator's finger and the rubber pump 3 is compressed, so that a pressure will be applied to the ink within the bottle 1. This pressure will move ink through the flexible slender tube 7 from the ink bottle 1 to the auxiliary ink tank 11. However, the ink thus pumped to the auxiliary tank 11 will not completely fill the auxiliary tank 11, due to the extension of the outlet pipe 13 partially into the tank, so that air will be trapped under pressure in the upper inner portion of the tank 11. Although the pen-carriage 21 will be moved back and forth along the guide rod 29 as driven by the balancing motor 33 according to the input to the motor, the ink within the auxiliary tank 11 will not splash, slosh or the like to any great extent due to the operation of the baffle plates 43, 45 within the tank that will dampen such ink movement. The ink will travel through the restricted passages apertures or holes 43a, 45a between the various chambers formed between the baffle plates, which baffle plates are transverse to the direction of relative movement of the pen-carriage. As a result, bubbles will not be produced in the ink that would otherwise find their way to the pen and adversely affect the ink recording line. Further, since the tank 11 is mounted on the pen-carriage and not mounted on the cantilevered pointer arm 25 it will not have any effect upon the pressure between the recording pen 15 and the recording paper 39, even though the volume of ink within the auxiliary tank 11 will change considerably, with a resulting change in weight. Furthermore, the trapped air space in the upper portion of the auxiliary tank 11 will absorb the negative pressure and pressure fluctuations caused by the deformation, particularly the extension and contraction, of the slender tube 7, particularly in high speed movement of the pen-carriage 21. Thus, the pressure fluctuations caused by the negative pressure and the flexing or deformation of the tube 7 will not be transferred to the pen 15, but will be absorbed by the air space that functions, with the tank 11 as a surge tank. When the negative pressure occurs within the tube 7, the pressure acts on the ink sent from the bottle 1 so as to return it to the bottle 1 again. When this happens, the inner air space trapped within the tank 11 will tend to decrease its pressure so that the air within the tank 11 will resist such negative pressure within the tube 7.

Figure 3B:

A similar effect is also obtained with the tank structure as shown in FIGS. 3a and 3b. The partition 45 of this embodiment being constructed of a plurality of circular plates 45 connected by the rod 47 with space therebetween to form chambers. The plates 45 will form the chambers within the tank 11 quite similar to those formed by the baffle plates 43 of FIG. 2a. It is contemplated that further modifications of the partitions or baffle plates may be employed without departing from the teachings and scope of the present invention.

Figure 4A:
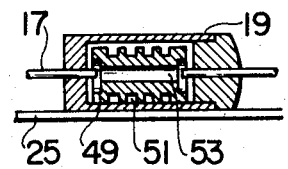
FIG. 4a is a longitudinal cross section view of the relaying means of FIG. 1.
Figure 4B:
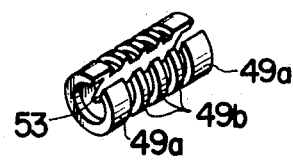

To further facilitate the supplying of ink to the pen 15, a relaying tank 19 is provided in fluid circuit between the auxiliary tank 11 and the pen 15. The detailed construction of this relaying tank 19 is shown in FIGS. 4a and 4b. The relaying tank 19 includes an outer casing having an inlet and outlet, and an inner capillary member 49 that will cause the ink to travel through the chamber by capillary action. The member 49 has a plurality of grooves as shown in FIGS. 4a and 4b, including a plurality of circumferential grooves 51 and an axial groove 53 providing fluid communication between the circumferential grooves. The circumferential grooves 51 are formed by opposed end flanges 49a and intermediate flanges 49b. The ink will be effectively sucked from the auxiliary tank 11 to the relaying tank 19 through the interconnecting tube 17 by means of capillary action resulting from the configuration of the above-mentioned grooves and their surrounding casing. If the diameter of the flanges of the member 49 is selected slightly less than the inner diameter of the cylindrical container or casing of the relaying tank 19, the ink will not completely fill the relaying tank 19 and there will be a slight air space therein, which is to be seen in FIG. 4a at the top. This air space will have the same effect as the trapped air space in the auxiliary tank 11, that is, the relaying tank 19 will function as a surge tank with the trapped pressurized air space at its top to absorb any fluctuations in ink pressure caused by vibrations and the like, particularly in the cantilevered pointer arm 25. Further, the relaying tank 19 will always be filled to substantially the same extent due to the capillary action, even though the liquid level within the auxiliary tank 11 will fluctuate between pumpings and the level within the ink bottle will decrease until refilled. Thus, with a generally constant amount of ink within the realying tank 19, its weight and accordingly the pressure it produces between the pen 15 and the recording paper 39 will not change. Also, the relaying tank is relatively small and is easily mounted closely adjacent the pen 15 to greatly facilitate the feed of ink thereto.

Although the present invention has been described with respect to a preferred construction for purposes of illustration, which preferred detailed construction has considerable advantages in its own right, it is contemplated that further variations, modifications and embodiments may be employed without departing from the spirit and scope of the present invention as defined by the following claims.

What is claimed is:

1. An ink supplying apparatus for a recorder that has a pen-carriage movable according to input information and carrying a pen for producing an ink record on recording paper corresponding to the movement of the carriage, comprising: an ink supply means for mounting on a stationary portion of the recorder and for supplying ink under pressure; an auxiliary ink container having at least two ink chambers separated by baffle means having liquid passages between said chambers substantially below the ink level in said auxiliary ink container, for providing and dampening free two-way ink flow between said chambers; means for mounting said auxiliary ink container on the movable pen-carriage of the recorder; first means for providing fluid communication between said ink supply means and said auxiliary ink container to supply said auxiliary ink container with ink under pressure from said ink supply means; and second means for providing fluid communication between said auxiliary ink container and the pen to supply ink to the pen from the auxiliary ink container.

2. The apparatus of claim 1, wherein said auxiliary ink container includes means forming a pressurized air space as it is partially filled with ink under pressure from said ink supply means to absorb fluctuations of ink pressure in said first means for providing fluid communication between said ink supply means and said auxiliary ink container.

3. The apparatus of claim 1, wherein said auxiliary ink container baffle means includes a sheet formed with tank wall engaging support portions and at least one substantially vertical baffle plate wall generally transverse to the direction of relative movement between the pen-carriage and stationary portions of the recorder; and said vertical baffle plate wall having holes extending therethrough.

4. The apparatus of claim 1, wherein said baffle means includes at least one plate extending generally perpendicular to the direction of relative movement between the pen-carriage and the stationary portions of the recorder, and said one plate having at least two spaced apart holes allowing fluid communication through the plate.

5. An ink supplying apparatus for a recorder that has a pen-carriage movable according to input information and carrying a pen for producing an ink record on recording paper corresponding to the movements of the carriage, comprising: an ink source; a relaying means including a storage tank divided into a plurality of parallel connected capillary passages; first means providing ink communication between said relaying means and said ink source; second means providing ink communication between said relaying means and the recorder pen; and said relaying means drawing ink from said ink source and supplying it to the pen by capillary action.

6. The apparatus of claim 5, including means for mounting said ink source on the movable carriage.

7. The apparatus of claim 5, including a pointer arm cantilevered from the movable carriage and carrying the recording pen at its outer end; and said ink relaying means being mounted on the cantilevered portion of said pointer arm closely adjacent the recording pen.

8. The apparatus according to claim 5, wherein said ink relaying means includes means forming a pressurized air space within its interior when it is drawing ink from said ink source and providing it to the recording pen by capillary action to form a surge tank means absorbing fluctuations in ink pressure leading to said relaying means.

9. The apparatus of claim 8, wherein said ink relaying means comprises an outer container and an inner capillary member formed with a plurality of capillary grooves about its periphery.

10. The apparatus of claim 9, wherein said grooves include a plurality of circumferential grooves and at least one interconnecting axial groove.

11. An ink supplying apparatus for a recorder that has a pen-carriage movable according to input information and carrying a pen for producing an ink record on recording paper corresponding to the movements of the carriage, comprising: an ink supply means for mounting on a stationary portion of the recorder and for supplying ink under pressure; an auxiliary ink container having at least two ink chambers separated by baffle means having liquid passages between said chambers substantially below the ink level in said auxiliary ink container, for providing and dampening free two-way ink flow between said chambers; means for mounting said auxiliary ink container on the movable pen-carriage of the recorder; first means for providing fluid communication between said ink supply means and said auxiliary ink container to supply said auxiliary ink container with ink under pressure from said ink supply means; an ink relaying means including a storage tank divided into a plurality of parallel connected capillary passages; second means for providing fluid communication between said auxiliary ink container and said ink relaying means; third means for providing fluid communication between said ink relaying means and the recorder pen; and said relaying means drawing ink from said auxiliary ink container and supplying it to the pen by capillary action.

12. The apparatus of claim 11, wherein said auxiliary ink container includes means forming a pressurized air space as it is partially filled with ink under pressure from said ink supply means to absorb fluctuations of ink pressure in said first means for providing fluid communication between said ink supply means and said auxiliary ink container; and said ink relaying means including means forming a pressurized air space within its interior when it is drawing ink from said ink supply means and providing it to the recording pen by capillary action to form a surge tank means absorbing fluctuations in ink pressure leading to said relaying means.

13. The apparatus of claim 12, including means for mounting said ink supply means on the movable carriage; a pointer arm cantilevered from the movable carriage and carrying the recording pen at its outer end; and said ink relaying means being mounted on the cantilevered portion of said pointer arm closely adjacent the recording pen.

14. The apparatus of claim 11, including means for mounting said ink supply means on the movable carriage; a pointer arm cantilevered from the movable carriage and carrying the recording pen at its outer end; and said ink relaying means being mounted on the cantilevered portion of said pointer arm closely adjacent the recording pen.

* * * * *